Oct. 11, 1949.  W. L. C. VAN ZWET  2,484,394
PROCESS FOR THE PREPARATION OF SILICIC-ACID ESTERS
Filed Feb. 6, 1947
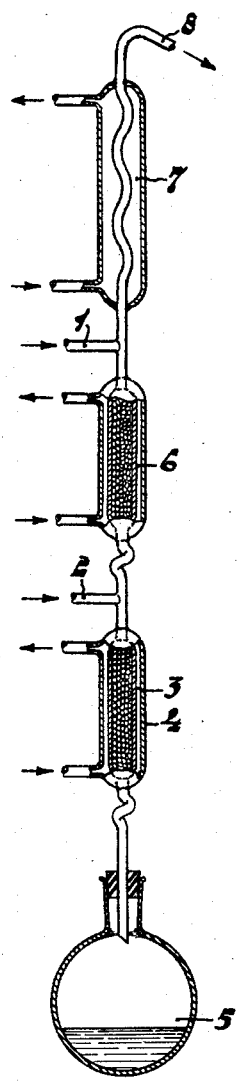
W. L. C. VAN ZWET
INVENTOR
BY
AGENT Patented Oct. 11, 1949

2,484,394

UNITED STATES PATENT OFFICE 2,484,394

PROCESS FOR THE PREPARATION OF SILICIC-ACID ESTERS

Willem Leendert Carolus van Zwet, Eindhoven, Netherlands, assignor to Hartford National Bank and Trust Company, Hartford, Conn., as trustee Application February 6, 1947, Serial No. 726,836
In the Netherlands August 11, 1944

Section 1, Public Law 690, August 8, 1946
Patent expires August 11, 1964

5 Claims. (Cl. 260—448.8)

This invention relates to a process of preparing silicic-acid esters from silicon halides and from one or more alkanols, and to a device that can be used with this process.

It is known to prepare tetraethylsilicate by dripping silicon tetrachloride into ethanol (cf. for example Journal of the American Chemical Society 50, 3058, 1928).

A drawback thereby involved, more particularly in the case of preparation on a large scale, consists in that the heat effects attended with the escape of large quantities of hydrochloric acid gas make it difficult for the reaction to be effected fully in the desired sense. On the one hand, considerable losses of silicon tetrachloride may thus occur and, on the other hand, part of the silicon may be linked in the form of compounds containing chains of two or more atoms of silicon.

To what degree the reaction of silicon tetrachloride with ethanol may take place in a manner which cannot thermally be controlled, is demonstrated by the following examples: If 16 g. of ethanol of room temperature are introduced into a Dewar vessel and there is added, in the course of a few seconds, an equivalent amount of 15 g. of silicon tetrachloride of same temperature, there occurs a strong rise in temperature up to, for example, 70° C., during which large quantities of vapour are produced.

If, however, the silicon tetrachloride is introduced into the Dewar vessel and subsequently ethanol is added, the temperature rapidly decreases by about 10° and then increases, in the course of a few minutes, up to approximately 35° C., likewise with a strong production of vapour.

According to the invention which aims at obviating these drawbacks, in the preparation of silicic-acid esters from silicon halides and from one or more alkanols use is made of alkanols which have been saturated beforehand fully or to the greater part with hydrogen halide.

The invention is based on the recognition of the fact that the observed production of heat is not brought about in the first place by the reaction of the alkanols upon the silicon halides (this reaction even appears to be frequently endothermic), but is brought about by the heat of dissolution in the reaction mixture of the hydrogen halides evolved during the reaction. Now, according to the invention, this production of heat may be decreased by avoiding any dissolution of the hydrogen halides during the reaction, which is preferably effected by preliminarily saturating the alkanols wholly or to the greater part with hydrogen halides. It is thus possible to effect the reaction with a small thermal effect at the temperature most desired.

According to one particular embodiment of the invention, the hydrogen halide split off in the preparation of silicic-acid ester is utilised for the complete or partial saturation of the alkanols before the latter are brought together with the silicon halides.

In order that the invention may be more clearly understood and readily carried into effect, it will be described more fully with reference to the accompanying drawing.

The figure shows diagrammatically a device for carrying out the process according to the invention, in which this principle is utilised. 1 and 2 denote the supply lines for the alkanols and for the silicon halides respectively. 3 is the reaction vessel with the associated water jacket and is filled with, for example, glass beads. The reacting substances which are introduced above into the vessel are allowed to react in it, the silicic-acid ester being removed at the bottom through a discharge tube to a receiver 5. In the cooled mixing vessel 6 the alkanols and the hydrogen halides split off during the formation of the ester are mixed together. The said mixing vessel is filled with glass beads by which the mixing is facilitated. The cooler 7 serves to condense any alkanol vapours escaping from the mixing vessel 6. The excess of hydrogen halides escapes through an outlet 8.

Example

In the above-described device 3.43 kg. of silicon tetrachloride and 5.20 kg. of ethanol are mixed together in about 90 minutes. Subsequently, any residues of hydrochloric acid present in the reaction mixture are removed, and the tetraethylsilicate is redistilled in vacuo. The yield amounts to 3.37 kg., this is 81% of what is theoretically possible. If in the same period of time an equal amount of silicon tetrachloride is dripped into an equal amount of alcohol contained in a glass flask of 10 litres capacity, the yield is at most from 50 to 60% in spite of the use of a flow-back cooler of large dimensions through which the hydrochloric acid produced in the reaction can escape.

What I claim is:

1. A process for preparing silicic acid esters by the reaction of an alkanol with a silicon halide, wherein the hydrogen halide formed by said reaction is inhibited from dissolving in the reaction mixture, comprising, the steps of first saturating an alkanol with a hydrogen halide, and then mixing said saturated alkanol with a silicon halide and allowing said silicon halide to react with said saturated alkanol for a sufficient time to produce a silicic acid ester.

2. The process as in claim 1 wherein the hydrogen halide formed by the reaction of the alkanol with the silicon halide is utilized to saturate said alkanol.

3. A process for preparing tetraethyl silicate by the reaction of ethanol with silicon tetrachloride, wherein the hydrogen chloride formed by said reaction is inhibited from dissolving in the reaction mixture, comprising, the steps of saturating said ethanol with hydrogen chloride and then mixing said saturated ethanol with silicon tetrachloride and allowing said silicon tetrachloride to react with said saturated ethanol for a sufficient time to produce tetraethyl silicate.

4. A continuous process for preparing a silicic acid ester by the reaction of an alkanol with a silicon halide, wherein the hydrogen halide formed by said reaction is inhibited from dissolving in the reaction mixture, comprising, the steps of establishing a reaction zone where said alkanol and said silicon halide react to form a silicic acid ester accompanied by evolution of a hydrogen halide, establishing a mixing zone above said reaction zone, introducing an alkanol into said mixing zone, introducing a silicon halide into said reaction zone, allowing the hydrogen halide formed in said reaction zone to pass upwardly into said mixing zone where said hydrogen halide mixes with and saturates said alkanol, allowing said saturated alkanol to pass downwardly into said reaction zone to mix with and react with said silicon halide, and withdrawing a silicic acid ester from the lower portion of said reaction zone.

5. The process as in claim 4, wherein the alkanol is ethanol, the silicon halide is silicon tetrachloride, the hydrogen halide is hydrogen chloride and the ester produced is tetraethyl silicate.

WILLEM LEENDERT CAROLUS van ZWET.

REFERENCES CITED

The following references are of record in the file of this patent:

UNITED STATES PATENTS

| Number | Name | Date |
|---|---|---|
| 2,114,866 | Vaughn | Apr. 19, 1938 |
| 2,271,860 | Goldsby | Feb. 3, 1942 |
| 2,374,511 | Upham | Apr. 24, 1945 |
| 2,406,621 | Marsden | Aug. 27, 1947 |

OTHER REFERENCES

Dearing et al., "Jour. Amer. Chem. Soc.," vol. 50 (1928), pages 3058–3062.

Schumb et al., "Jour. Amer. Chem. Soc.," vol. 63, (1941), pages 2753–2755.